US009534967B2

(12) United States Patent
Chainer et al.

(10) Patent No.: US 9,534,967 B2
(45) Date of Patent: Jan. 3, 2017

(54) CALIBRATING THERMAL BEHAVIOR OF ELECTRONICS

(71) Applicant: International Business Machines Corporation, Armonk, NY (US)

(72) Inventors: Timothy J. Chainer, Putnam Valley, NY (US); Pritish R. Parida, Fishkill, NY (US); Mark D. Schultz, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/154,448

(22) Filed: May 13, 2016

(65) Prior Publication Data
US 2016/0252408 A1    Sep. 1, 2016

Related U.S. Application Data

(62) Division of application No. 13/691,145, filed on Nov. 30, 2012, now Pat. No. 9,354,126.

(51) Int. Cl.
*G01K 15/00* (2006.01)
*G01K 7/02* (2006.01)

(52) U.S. Cl.
CPC ............ *G01K 15/005* (2013.01); *G01K 7/02* (2013.01)

(58) Field of Classification Search
USPC ....................................................... 374/1, 179
See application file for complete search history.

(56) References Cited

U.S. PATENT DOCUMENTS

| 4,840,495 | A | * | 6/1989 | Bonnefoy | ............... | G01N 25/18 374/43 |
| 6,203,191 | B1 | * | 3/2001 | Mongan | ................... | G01K 7/42 374/20 |
| 8,449,173 | B1 | * | 5/2013 | Strong | ..................... | G06F 11/24 324/500 |
| 8,868,250 | B2 | | 10/2014 | Jensen et al. | | |
| 2002/0122298 | A1 | | 9/2002 | Cohen et al. | | |
| 2002/0147932 | A1 | | 10/2002 | Brock et al. | | |
| 2003/0139894 | A1 | * | 7/2003 | Ryan | ..................... | G01K 17/12 702/132 |

(Continued)

FOREIGN PATENT DOCUMENTS

WO    WO2010050080 A1    5/2010

OTHER PUBLICATIONS

Satoshi Itoh et al, "Power consumption and efficiency of cooling in a Data Center", Oct. 2010. IEEE/ACM Int'l Conf. on Grid Computing, pp. 305-312.

(Continued)

*Primary Examiner* — Mirellys Jagan
(74) *Attorney, Agent, or Firm* — Daniel P. Morris; Otterstedt, Ellenbogen & Kammer, LLP

(57) ABSTRACT

A method includes determining a relationship between indirect thermal data for a processor and a measured temperature associated with the processor, during a calibration process, obtaining the indirect thermal data for the processor during actual operation of the processor, and determining an actual significant temperature associated with the processor during the actual operation using the indirect thermal data for the processor during actual operation of the processor and the relationship.

5 Claims, 8 Drawing Sheets

(56) References Cited

U.S. PATENT DOCUMENTS

| | | |
|---|---|---|
| 2006/0013281 A1* | 1/2006 | Sri-Jayantha ........... G06F 1/206 374/163 |
| 2007/0067136 A1 | 3/2007 | Conroy et al. |
| 2007/0097620 A1 | 5/2007 | Leech et al. |
| 2008/0040067 A1* | 2/2008 | Bashor .................... G06F 11/24 702/132 |
| 2008/0059004 A1 | 3/2008 | Katoh et al. |
| 2008/0186670 A1 | 8/2008 | Lyon et al. |
| 2009/0044027 A1 | 2/2009 | Piazza |
| 2009/0207565 A1 | 8/2009 | Glover et al. |
| 2009/0271141 A1 | 10/2009 | Coskun et al. |
| 2010/0205607 A1 | 8/2010 | Shivanna |
| 2010/0315223 A1 | 12/2010 | Gross et al. |
| 2010/0324750 A1 | 12/2010 | Gaskins et al. |
| 2012/0020150 A1 | 1/2012 | Shah et al. |
| 2014/0140364 A1* | 5/2014 | Charles .................... G01K 7/01 374/1 |
| 2014/0153607 A1 | 6/2014 | Chainer et al. |
| 2016/0178548 A1* | 6/2016 | Berry ...................... F28F 27/00 165/287 |

OTHER PUBLICATIONS

RD 547047 A, Nov. 10, 2009, Hewlett-Packard Co.

* cited by examiner

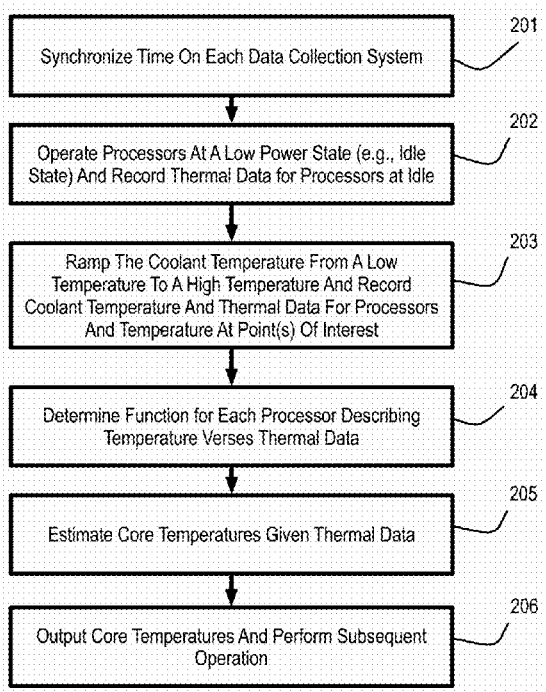
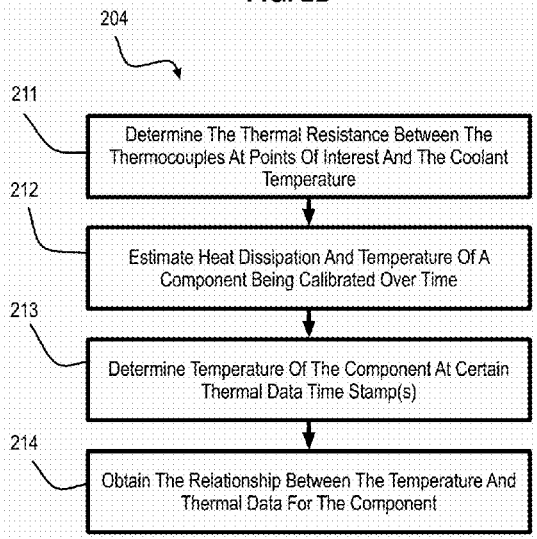
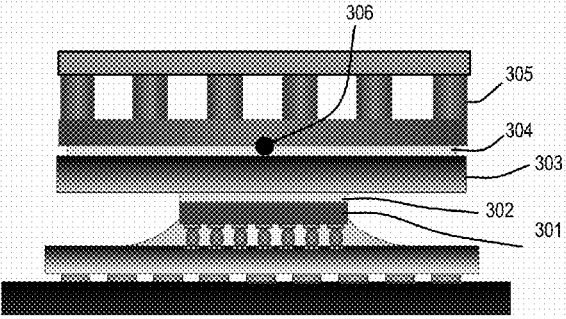

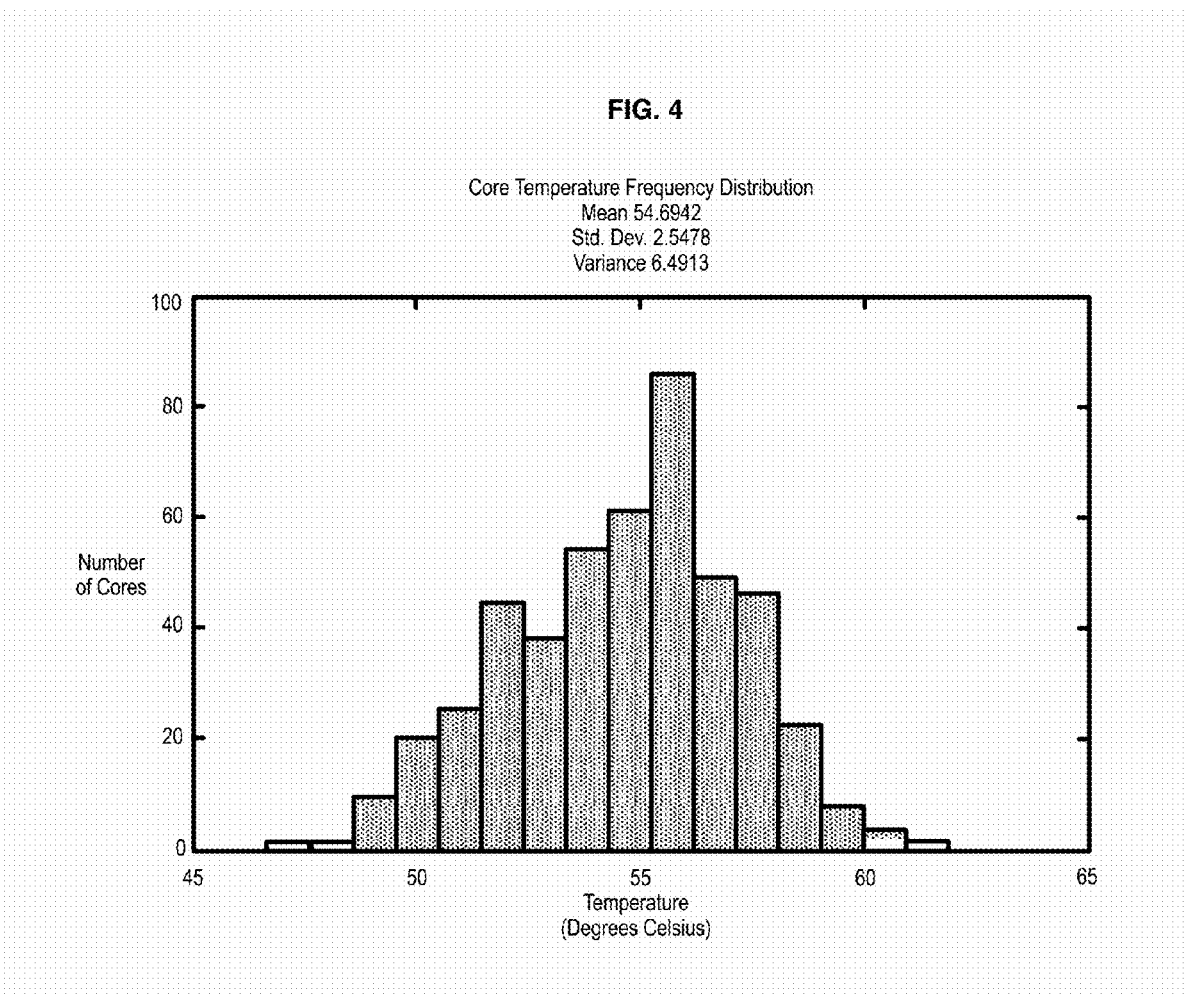

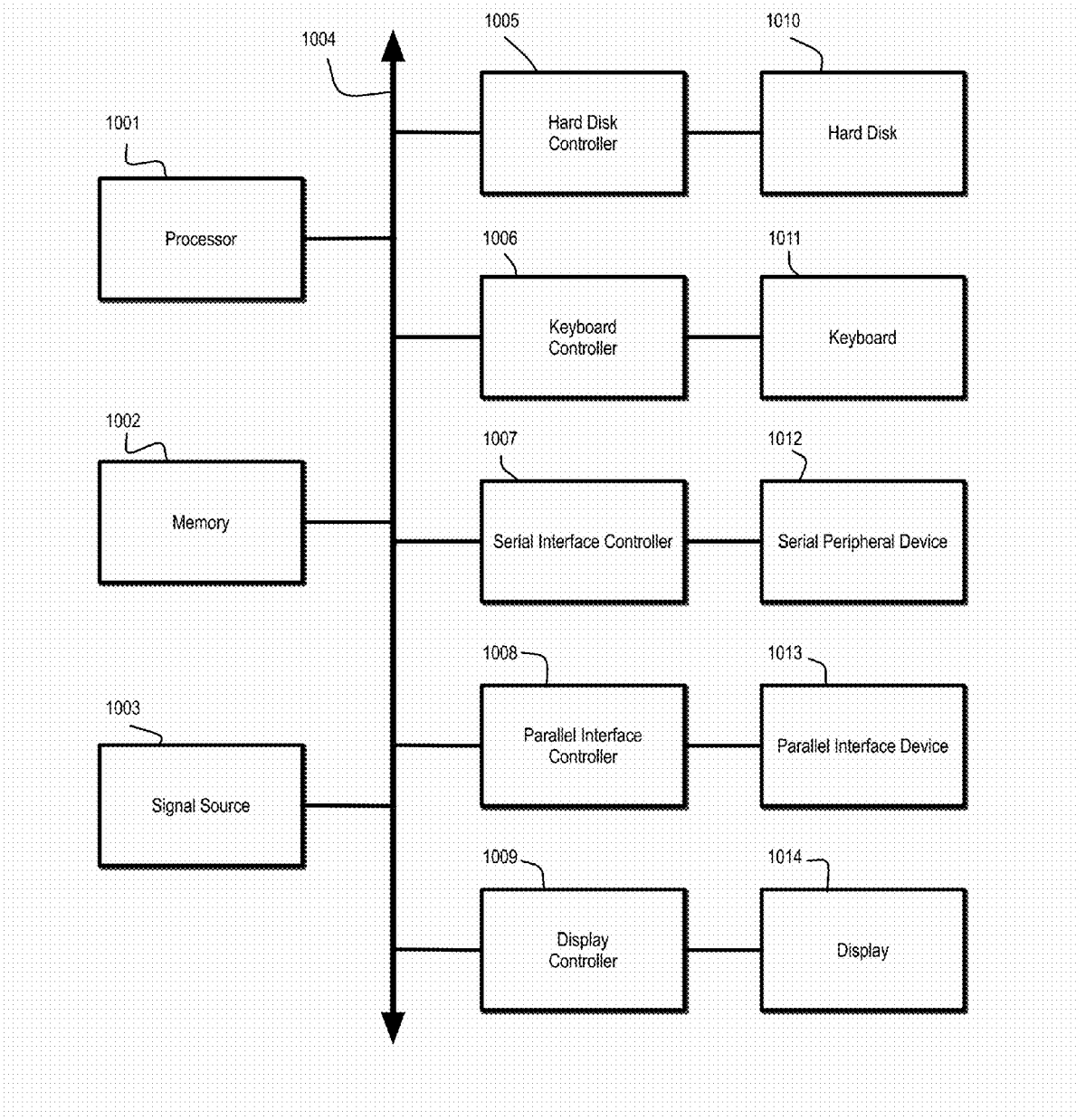

CALIBRATING THERMAL BEHAVIOR OF ELECTRONICS

Furthermore, this patent application is a divisional of U.S. patent application Ser. No. 13/691,145 filed Nov. 30, 2012, entitled "CALIBRATING THERMAL BEHAVIOR OF ELECTRONICS." The complete disclosure of the aforementioned U.S. patent application Ser. No. 13/691,145 is expressly incorporated herein by reference in its entirety for all purposes.

This invention was made with Government support under Contract No.: DE-EE0002894 (awarded by Department of Energy (DOE)). The Government has certain rights in this invention.

BACKGROUND

This disclosure relates to the thermodynamic arts, and more particularly, to techniques for estimating processor junction temperatures and optionally controlling processor operation based on the same.

Modern integrated circuit chips, and servers or other computing devices using them, pose significant thermal control challenges. Liquid cooling, air cooling, and hybrid liquid-air cooling solutions have been employed.

BRIEF SUMMARY

According to an exemplary embodiment of the present disclosure, a method includes determining a relationship between indirect thermal data for at least a first processor and a measured temperature associated with the at least first processor, during a calibration process, obtaining the indirect thermal data for the at least first processor during actual operation of the at least first processor, and determining an actual significant temperature associated with the at least first processor during the actual operation using the indirect thermal data for the at least first processor during actual operation of the at least first processor and the relationship.

According to an exemplary embodiment of the present disclosure, a calibration method for a component dissipating heat into a coolant cooled apparatus includes determining a heat dissipation of the component, determining a thermal resistance from the component to a coolant, determining a measured temperature of the component according to the heat dissipation and the thermal resistance at a plurality of time stamps included in thermal data output by the component, and determining a relationship between the measured temperature and the thermal data for the component.

According to an embodiment of the present disclosure, a computer program product comprises a computer readable storage medium having computer readable program code embodied therewith, the computer readable program code comprising computer readable program code configured to perform at least one of a calibration method and a determination of an actual significant temperature associated with a processor.

BRIEF DESCRIPTION OF THE SEVERAL VIEWS OF THE DRAWINGS

Preferred embodiments of the present disclosure will be described below in more detail, with reference to the accompanying drawings:

FIGS. 2A-B are flow diagrams of a method for calibrating thermal data of processors to actual temperature values according to an exemplary aspect of the invention;

FIG. 3 is a diagram of a CPU module with a cold plate according to an exemplary aspect of the invention;

FIG. 4 is a graph of core temperature frequency distribution according to an exemplary aspect of the invention;

FIG. 10 is a block diagram depicting an exemplary computer system for calibrating thermal data of processors to actual temperature values according to an exemplary embodiment of the present disclosure.

DETAILED DESCRIPTION

Disclosed is a method for of simultaneously calibrating indirect thermal data of processors to actual temperature values of the processors.

Processor core thermal data can be reported by an on-chip Digital Thermal Sensor (DTS), which can be accessed through a Platform Environment Control Interface (PECI). The processor core thermal data reported by the DTS does not reflect the actual junction/cores temperature, but rather reflects a delta or difference between a current temperature and a maximum junction temperature of the die (Tj). Stated another way, the processor core thermal data reported by the DTS is an indirect value. According to an exemplary embodiment of the present disclosure, a method of calibrating the processor thermal data to actual temperature values is described. Thus, one or more embodiments can advantageously be employed to determine actual temperatures of significance (e.g., actual junction temperatures) in systems where only indirect values of thermal data are available.

Embodiments of the present disclosure are applicable to systems including a single server having multiple processors, a processor having multiple cores, a system including racks of servers, and the like. That is, embodiments of the present disclosure are not to be limited in scope by the exemplary systems described herein.

Figure 1:
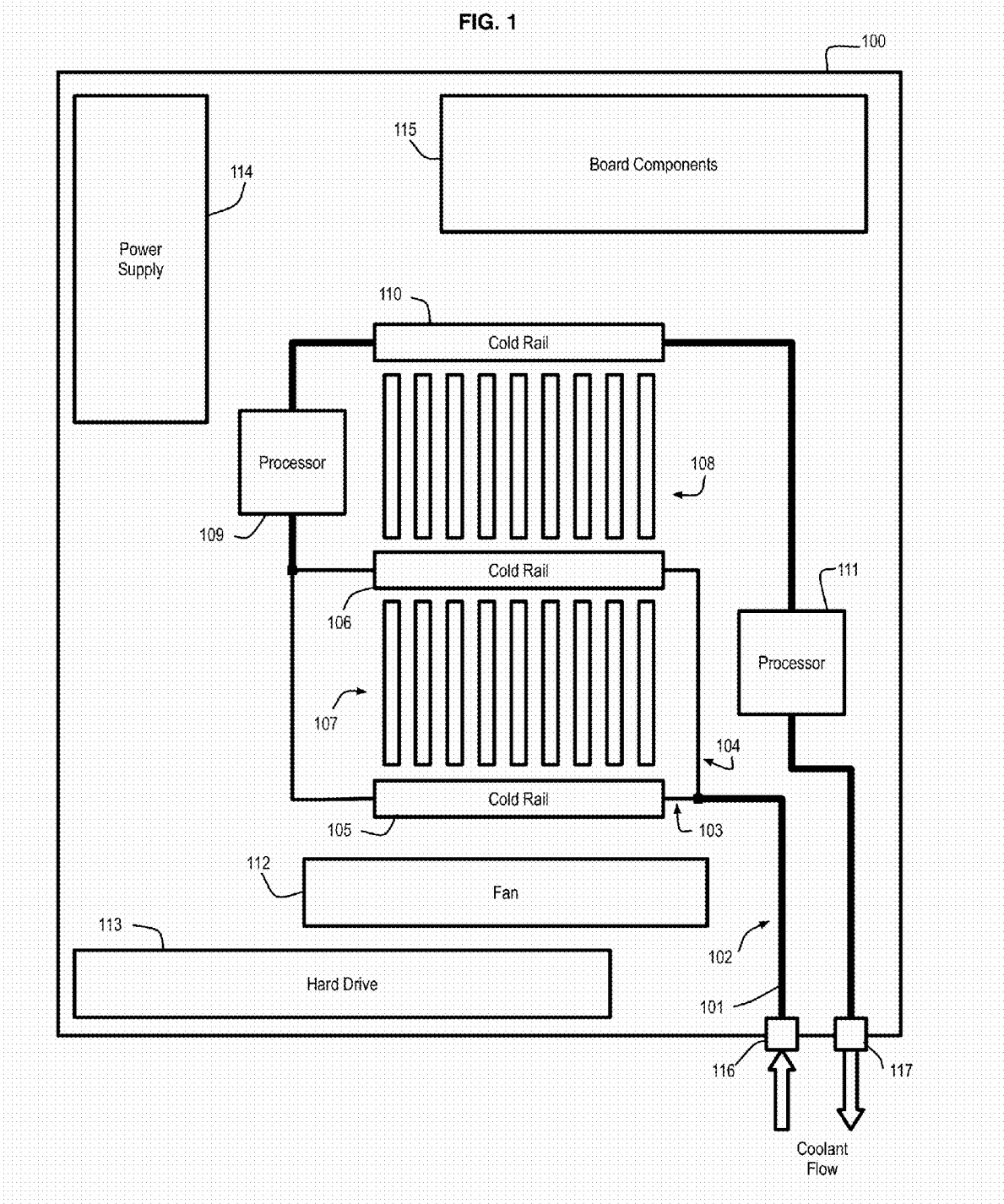
FIG. 1 is a block diagram depicting an exemplary parallel flow path for a liquid coolant in a hybrid air/liquid cooled computer system according to an exemplary aspect of the invention.

Turning now to a particular exemplary system, FIG. 1 is a block diagram of an exemplary liquid cooled server 100 including two processors and two memory modules. Within the liquid cooled server 100, a heat transfer assembly 101 includes a coolant flow path 102 (e.g., copper tubing). In the exemplary liquid cooled server 100, the coolant, e.g., water, enters from a first side of the partially liquid cooled server, wherein the coolant flow path bifurcates into two parallel flow paths 103 and 104 passing through a first cold rail 105 and a second cold rail 106 and cooling a first bank of Dual Inline Memory Modules (DIMMs) 107 and partially cooling a second bank of DIMMs 108. The two parallel flow paths 103 and 104 then recombine and pass through a first processor 109 connected to a cold plate structure, continuing through a third cold rail 110, and then through a second processor 111. The DIMMs can be connected to a pair of conduction spreaders (not shown), which are then bolted to the respective cold rails 105 and 106, which have coolant flowing there-through. The liquid cooled server 100 may include various other components, such as one or more fans 112 providing additional cooling, one or more hard drives 113, a power supply module 114, and board components 115. One of ordinary skill in the art would appreciate that the present disclosure is not limited to the components described here and that these components are used only to illustrate an exemplary embodiments thereof. For example, one or more embodiments can be used in situations with only a single coolant path.

The skilled artisan will appreciate that the manufacturer of processors 109, 111 will typically provide one or more on-chip digital thermal sensors.

According to an embodiment of the present disclosure, a method for simultaneously calibrating the thermal data of the processors to actual temperature values enables various applications. For example, given a calibration curve, the actual processor core temperatures can be determined from the measured (indirect) thermal data (for example, as measured by thermocouples disposed at an input port 116 and an output port 117 of the liquid cooled server 100). The thermal data can be collected under simulated workloads or utility programs that can be executed for any length of time. These simulated workloads or utility programs can be referred to as CPU exercisers, which stress the processors and/or provide steady heat dissipation from the processors.

More particularly, and according to an embodiment of the present disclosure, a method can be applied simultaneously to a plurality of processors to calibrate the indirect processor thermal data for a plurality of processors disposed in a plurality of servers (e.g., a total of forty-one in a non-limiting example) in a rack to actual temperature values of the components (e.g., cores). According to an embodiment of the present disclosure, a calibration relationship between the indirect processor thermal data and the temperature of a processor may be expressed as:

$$\text{Temperature}=A-B*|\text{Thermal Data}|, \quad (1)$$

where A and B are constants associated with each processor and the thermal data can be the output of a DTS. Further, the constants A and B can be different for different processors. According to an embodiment of the present disclosure, values of each of these constants are determined for each processor such that temperatures may be determined for each processor given that processor's thermal data.

Embodiments of the present disclosure will be described with reference to a system of liquid cooled processors. One of ordinary skill in the art would recognize that embodiments of the present disclosure are not limited to this example and that various systems may be calibrated according to the teachings of the present disclosure, including more generally coolant cooled apparatus such as air cooled systems, multi-phase cooled systems, etc.

For purposes of the following description, exemplary embodiments of the present disclosure are described in terms of multicore processors. It should be understood that exemplary aspects of the present disclosure are also applicable to servers, processors (single core and multi-core), individual cores, etc. The present disclosure is not limited to the specific examples described herein.

Referring to FIG. 2A, given a system comprising a plurality of processors and a plurality of data collection systems, clocks of the data collection systems can be synchronized. For example, in the case of a plurality of primary server thermal data collection systems (e.g., Baseboard Management Controller, Integrated Management Module or Intelligent Platform Environment Interface), the clocks of the primary server thermal data collection systems can be synchronized with one another at block 201. In another example, clocks of one or more secondary data acquisition systems (e.g., Labview system available from National Instruments Corporation, Austin, Tex., USA) can be synchronized with that of the primary data acquisition system(s) at block 201. The primary data acquisition system(s) can be used to collect the thermal data (e.g., DTS value) from a plurality of processors. The secondary data acquisition system(s) can be used to collect thermocouple data (e.g., coolant temperature).

A thermal data measurement can be performed at block 202 for each processor at an idle state or at a low power state at which the heat dissipation from the processors is low. In terms of the exemplary system of FIG. 1, the thermal data measurement can be taken at a point anywhere on the thermal path between the liquid coolant and the processor (for example, at the base of the cold plate, as shown in FIG. 3, which is attached to the processor or at the processor lid). Coolant temperature is also measured.

FIG. 3 shows an exemplary CPU module comprising a chip 301, a first thermal interface material 302 (e.g., Indium), a lid 303, a second thermal interface material 304 (e.g., thermal grease), a cold plate 305, and a thermocouple 306 at the cold plate base.

Determining the thermal resistance of a path from the coolant inlet to the processor can improve the accuracy of the calibration, but is not required since the power dissipation is low in the calibration stage, the temperature drop across the path is minimal. This thermal resistance can be obtained from experiments or from numerical simulations (e.g., via finite element techniques such as ANSYS software available from ANSYS, Inc., Canonsburg, Pa., USA) or finite difference techniques) of the processor-to-cold-plate package.

At block 203, the liquid coolant temperature, e.g., as measured at the input port 116 or the output port 117 of the liquid cooled server 100), is ramped from a low Temperature T1 (e.g., 20 C) to a high Temperature T2 (e.g., 50 C). From the resulting data, using thermodynamic relations, the chip temperatures can be estimated. An exemplary method for estimating the chip heat dissipation and the chip temperature is set forth below.

Consider the thermal resistance R_th1 from the cold plate base (temperature=T_CP_base) to the coolant inlet (temperature=T_in):

$$R\_th1=(T\_CP\_base-T\_in)/Q \quad (2)$$

R_th1 is known for a given flow-rate, either from experimental data or from ANSYS (or other finite element or finite difference) simulations. The cold plate base temperature T_CP_base can be determined from experiments. Coolant inlet temperature T_in and heat dissipation Q may be unknown.

As is well known to the skilled artisan, the heat dissipation is equal to the mass flow rate m_dot times the specific heat at constant pressure Cp times the temperature differential:

$$Q=m\_dot*Cp*(T\_out-T\_in) \quad (3)$$

The mass flow rate m_dot is known. Further, for the processor 111, T_out should be the same as the coolant temperature at the server outlet, and hence, is also known.

The resulting two equations having two unknowns can be solved to obtain:

$$T\_in = (K * T\_out - T\_CP\_base)/(K-1), \text{ where } K = R\_th1 * m\_dot * Cp. \quad (4)$$

$$Q = (T\_CP\_base - T\_out)/(R\_th1 - 1/(m\_dot * Cp)) \quad (5)$$

The chip temperatures for the processors 111 and 109 can then be estimated as follows:

$$T\_Chip\_CPU1 = T\_out + Q * [R\_th - (1/(m\_dot * Cp))] \quad (6)$$

$$T\_Chip\_CPU2 = T\_Chip\_CPU1 - 0.2\ C\ @\ \text{Idle state} \quad (7)$$

R_th (the thermal resistance from the coolant inlet temperature to the chip temperature) can be determined for a given flow rate, either from experimental data or from ANSYS or other finite element or finite difference simulations. In a non-limiting example, from ANSYS modeling:

$$R\_th1 = 0.04593 * (gpm)^{(-0.509)} + 0.01067 \quad (8)$$

$$R\_th = 0.04593 * (gpm)^{(-0.509)} + 0.09697 \quad (9)$$

The unit gpm (gallons per minute) can be converted to 1 pm (liters per minute) by multiplying by 3.78541.

The determination of the relationships between the measured thermal data and measured temperature values is depicted generally in block 204 and more particularly in FIG. 2B.

Referring to FIG. 2B, the relationships between the measured thermal data and measured temperature values can be determined by determining the thermal resistance between one or more thermocouples at respective points of interest and the coolant temperature at block 211. At block 212, a heat dissipation and an estimated temperature of a component (e.g., chip) can be determined based on the thermal resistance, the coolant temperature and a heat transfer function at a plurality of times, which may be different than the times associated with the time stamps. Using a temporal variation of component temperature obtained at block 212, the component's temperature can be estimated for each time stamp included in the thermal data for the component at block 213. With temperature and thermal data known at each time stamp, the relationship between the temperature and thermal data can be determined for the component at block 214.

Referring again to FIG. 2A, the relationship between the temperature and thermal data for each component can be used to determine the temperatures at block 205.

It should be understood that the thermal data is measured separately during calibration (e.g., at block 202) and during an operation for during the temperatures at block 205.

The temperatures determined at block 205 can be used in subsequent methods (block 206), for example, to control the operation of the component based on the actual significant temperature determined for the component. Note that the temperatures determined at block 205, referred to herein as the actual significant temperature include a derived estimate of an absolute temperature. One of ordinary skill in the art would appreciate that the actual significant temperature can vary from the absolute temperature, for example, due to noise, etc.

In a case where values for CPU temperature and CPU thermal data are determined at different times, time-stamps for CPU1 and CPU2 temperature (if different than that for CPU thermal data) are matched. That is, matching can be carried out if the values for chip temperature from equations (6) and (7) were determined at times that are not the same as the times when the CPU thermal data was measured.

Figure 7A:
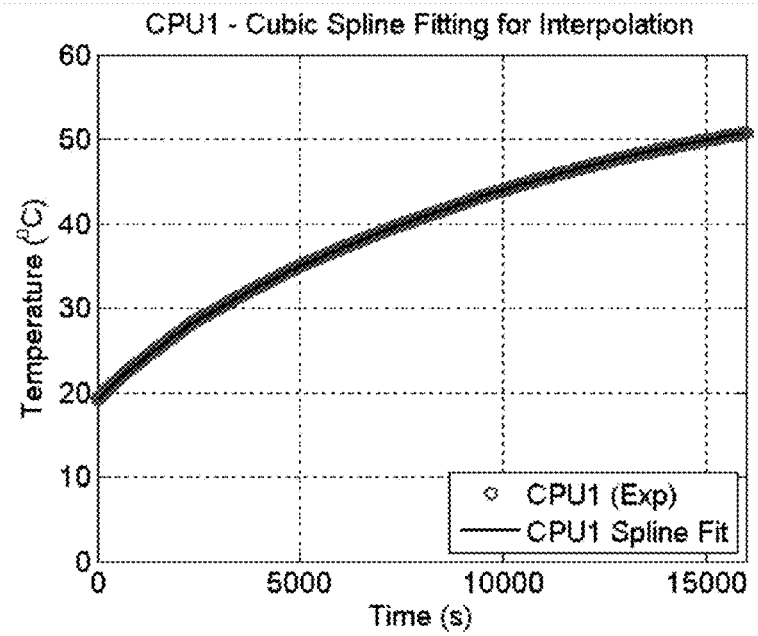
FIGS. 7A-B show respective cubic spline fittings of temperature data for interpolation, for two different CPUs according to an exemplary aspect of the invention.
Figure 7B:
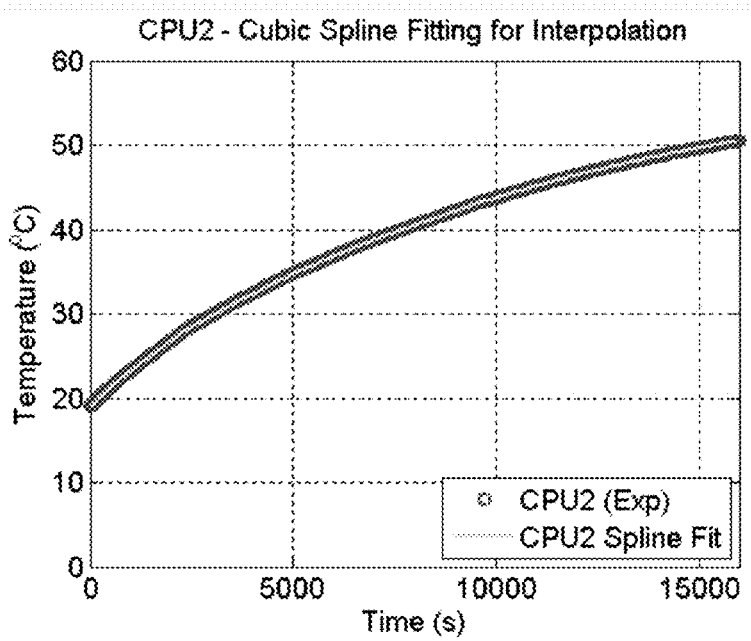
Figure 8A:
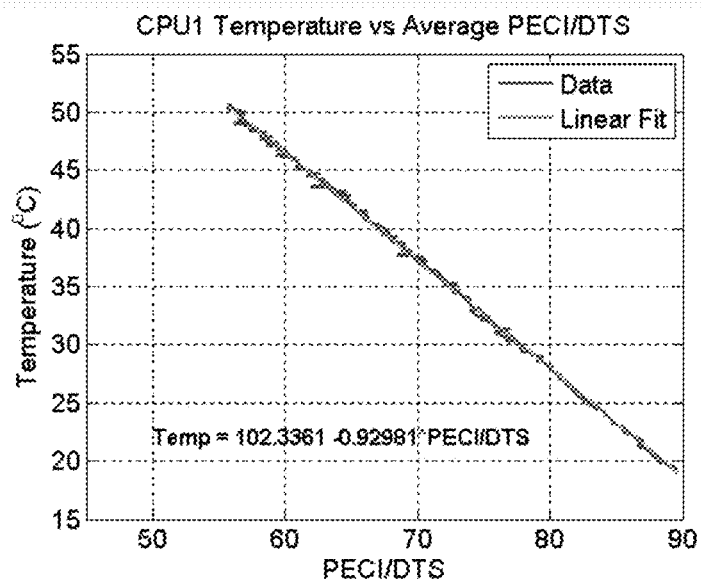
FIGS. 8A-B show respective plots of processor temperature versus thermal data, wherein the thermal data is six-core average PECI/DTS, for two different CPUs, according to an exemplary aspect of the invention.
Figure 8B:
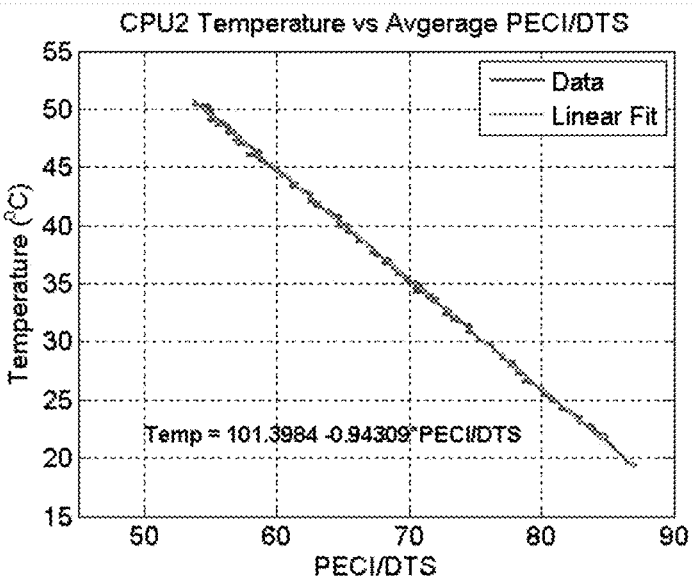
Figure 9A:
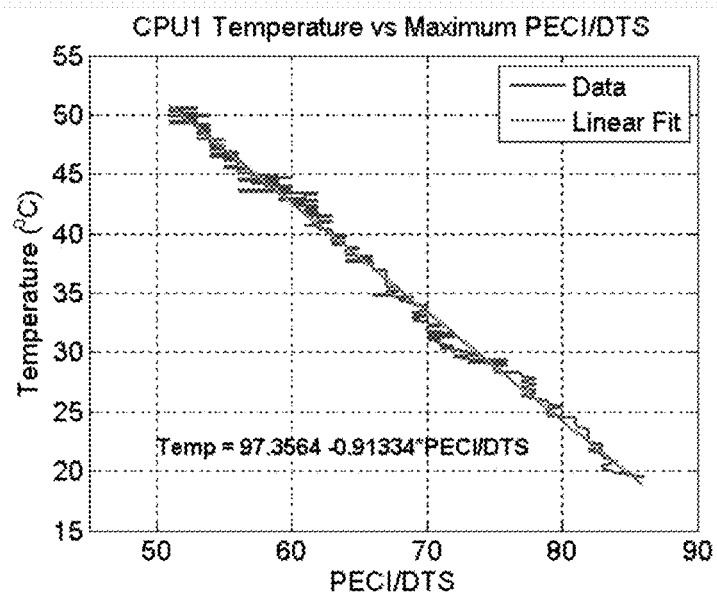
FIGS. 9A-B show respective plots of processor temperature versus thermal data, wherein the thermal data is maximum PECI/DTS, for two different CPUs, according to an exemplary aspect of the invention.
Figure 9B:
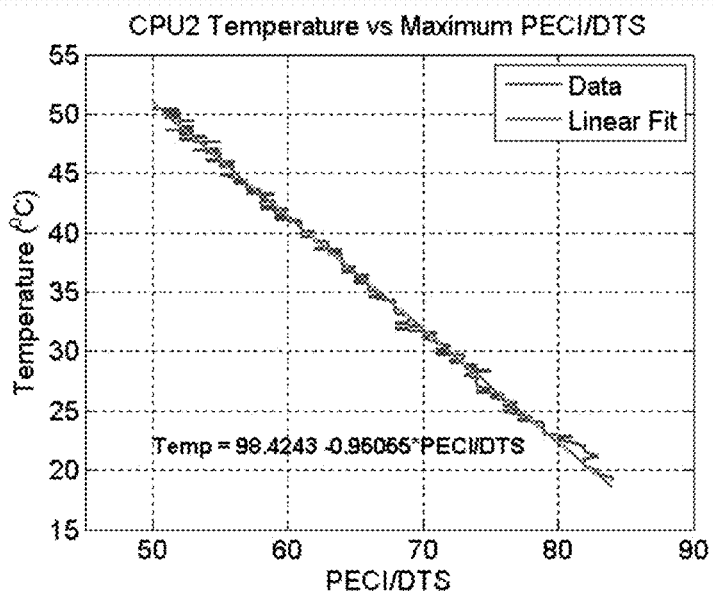

Interpolation, such as cubic-spline interpolation, can be carried out to obtain the CPU1 and CPU2 temperature values at the CPU thermal data time-stamps. This is shown in FIGS. 7A-B for first CPU (at 702) and second CPU (at 704). Temperature vs. CPU thermal data can thus be plotted and temperature as a function of CPU thermal data can be determined. Non-limiting examples of the CPU thermal data that the temperature may be determined as a function of include:

six (or other predetermined number) Core Average DTS (digital thermal sensor) for each CPU, or Maximum PECI/DTS of each CPU, or Each Core DTS The exemplary method was applied to simultaneously calibrate the CPU thermal data of all 41 servers in the rack to actual temperature values. The relationship between the CPU thermal data and actual temperature was determined to be linear and of the form A−B*|DTS|, where A and B are constants and were observed to be different for different processors. FIGS. 8A-B show respective plots of processor temperature versus thermal data, wherein the thermal data is six-core average PECI/DTS, for two different CPUs (at 802 and 804). FIGS. 9A-B show respective plots of processor temperature versus thermal data, wherein the thermal data is maximum PECI/DTS, for two different CPUs (at 902 and 904). The values of A and B in each case are shown on the graphs, and may be determined using linear regression, for example.

This calibration relationship can be applied to thermal data collected for different CPU exerciser settings. FIG. 4 shows an exemplary core temperature frequency distribution. It can be seen that there is significant core to core temperature variability. It was also observed that even within a single CPU, there could be a core to core temperature variability of more than about 10 degrees Celsius even with liquid cooling. For air cooled systems, this core to core temperature variability could be even worse.

In one non-limiting exemplary application of one or more embodiments, the relatively cooler cores and relatively hotter cores are identified at the installation phase, and the IT workload is provisioned to go to the relatively cooler cores first and then to the relatively hotter cores. Moreover, in addition to the preceding or alternatively, the servers with relatively hotter cores can be placed in relatively cooler zones in a data center. Similarly, the cooling system can be provisioned to have more cooling for the relatively hotter cores and less cooling for the relatively cooler cores.

In another non-limiting exemplary application, such simultaneous calibration is performed at regular intervals of time and is compared against a reference time calibration data to quantify the system performance improvement or deterioration over time.

Figure 5:
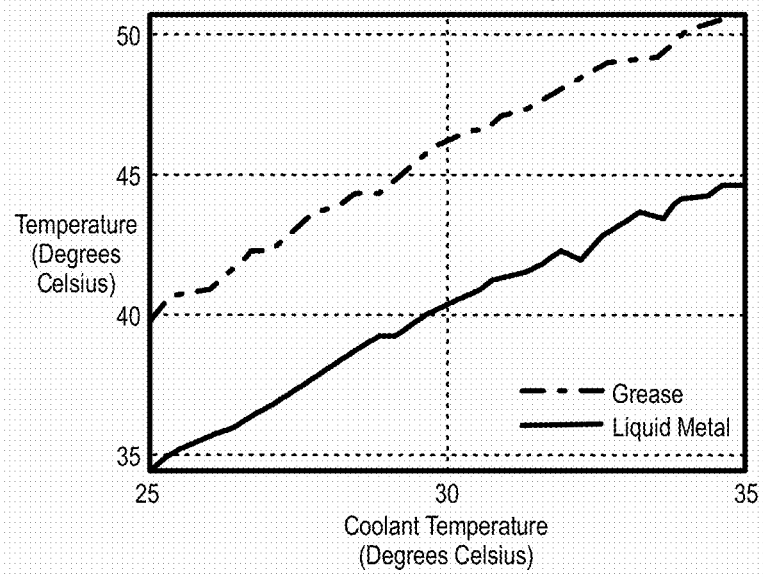
FIG. 5 is a graph of core average temperature for a first processor according to an exemplary aspect of the invention.
Figure 6:
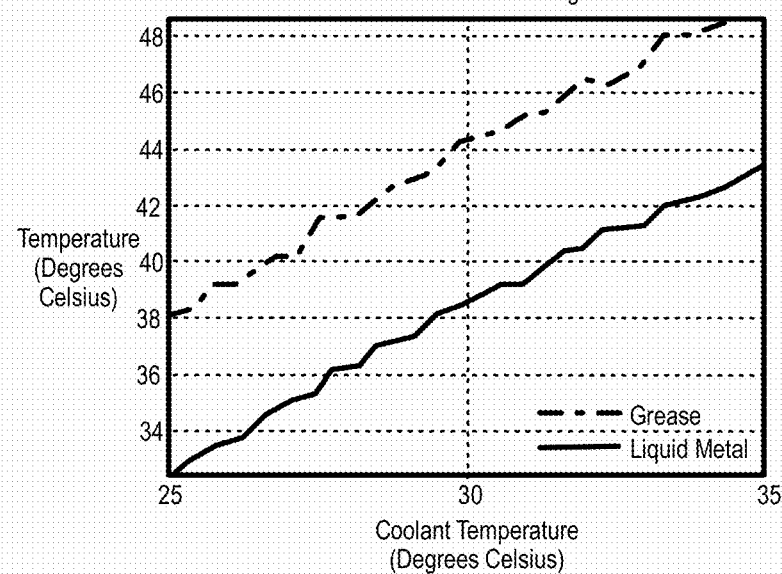
FIG. 6 is a graph of core average temperature for a second processor according to an exemplary aspect of the invention.

In still another non-limiting exemplary application, one or more embodiments can be employed to compare the thermal performance of different thermal interface materials. FIG. 5 and FIG. 6 show the benefit of using liquid metal as thermal interface material instead of thermal grease (the former runs about 5 degrees Celsius cooler than the latter in this non-limiting example). Thus, the selection of thermal interface material is another non-limiting exemplary application.

In many air-cooled servers, the speed of each server fan (e.g., measured in revolutions per minute (rpm)) is closely related to the CPU core temperatures, if the core temperature is in the vicinity of the maximum junction temperature. Thus, if the processors are qualified at the assembly stage to have less core-to-core variability, significant amounts of IT power can be saved just by having the server fans run at a lower speed for a similar type of workload. Accordingly, in one or more exemplary embodiments, for processors calibrated at an assembly stage, a server may be manufactured having low core-to-core variability. That is, the matching components can be selected in the manufacturing of a server. As a result, the fans of a given server may be run at a lower speed for a given workload, at least because a hottest core is less of a factor on the server.

Many other applications of one or more embodiments, to obtain significant impact on overall system energy consumption and/or system performance, will be apparent to the skilled artisan given the teachings herein. The following list is a non-limiting summary of several applications:

Identifying relatively cooler and relatively hotter cores
Cooling provisioning
Workload provisioning
System Reliability study
Product qualification
Processor Power Mapping
Thermal interface material performance deterioration/improvement over time
Comparing the performance of different thermal interface materials
etc.

Again, it should be understood that the exemplary applications of the calibration are not limiting. One with ordinary skill in the art would appreciate that various other applications exist within the scope of the present disclosure.

As noted, according to an exemplary embodiment of the present disclosure, simultaneous calibration can be performed at regular intervals of time and be compared against a reference time calibration data to quantify the system performance improvement/deterioration over time. That is, a temperature history may be recorded for one or more processors, such that changes in the thermal performance of a processor may be detected.

Given the discussion thus far, it will be appreciated that, in general terms, an exemplary method, according to an aspect of the invention, includes determining a relationship between indirect thermal data for at least a first processor and a measured temperature associated with the at least first processor, during a calibration process (see for example, block 204), obtaining the indirect thermal data for the at least first processor during actual operation of the at least first processor and determining an actual significant temperature associated with the at least first processor during the actual operation using the indirect thermal data for the at least first processor during actual operation of the at least first processor and the relationship (see for example, block 205).

Given the discussion thus far, it will be appreciated that, in general terms, an exemplary calibration method for a component dissipating heat into a coolant cooled apparatus, according to an aspect of the invention, includes determining a heat dissipation of the component (see for example, block 212), determining a thermal resistance from the component to a coolant (see for example, block 211), determining a measured temperature of the component according to the heat dissipation and the thermal resistance at a plurality of time stamps included in thermal data output by the component (see for example, block 213), and determining a relationship between the measured temperature and the thermal data for said component (see for example, block 214).

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

For example, FIG. 10 is a block diagram depicting an exemplary computer system for simultaneously calibrating thermal data of processors to actual temperature values of the processors according to an embodiment of the present disclosure. The computer system shown in FIG. 10 includes a processor 1001, memory 1002, signal source 1003, system bus 1004, Hard Drive (HD) controller 1005, keyboard controller 1006, serial interface controller 1007, parallel interface controller 1008, display controller 1009, hard disk 1010, keyboard 1011, serial peripheral device 1012, parallel peripheral device 1013, and display 1014.

In these components, the processor 1001, memory 1002, signal source 1003, HD controller 1005, keyboard controller 1006, serial interface controller 1007, parallel interface controller 1008, display controller 1009 are connected to the system bus 1004. The hard disk 1010 is connected to the HD controller 1005. The keyboard 1011 is connected to the keyboard controller 1006. The serial peripheral device 1012 is connected to the serial interface controller 1007. The parallel peripheral device 1013 is connected to the parallel interface controller 1008. The display 1014 is connected to the display controller 1009.

In different applications, some of the components shown in FIG. 10 can be omitted. The whole system shown in FIG. 10 is controlled by computer readable instructions, which are generally stored in the hard disk 1010, EPROM or other non-volatile storage such as software. The software can be downloaded from a network (not shown in the figures), stored in the hard disk 1010. Alternatively, software downloaded from a network can be loaded into the memory 1002 and executed by the processor 1001 so as to complete the function determined by the software.

The processor 1001 may be configured to perform one or more methodologies described in the present disclosure, illustrative embodiments of which are shown in the above figures and described herein. Embodiments of the present disclosure can be implemented as a routine that is stored in memory 1002 and executed by the processor 1001 to process the signal from the signal source 1003. As such, the computer system is a general-purpose computer system that becomes a specific purpose computer system when executing the routine of the present disclosure.

Although the computer system described in FIG. 10 can support methods according to the present disclosure, this system is only one example of a computer system. Those skilled of the art should understand that other computer system designs can be used to implement the present invention.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A calibration method for a component dissipating heat into a coolant cooled apparatus, the method comprising:
determining a heat dissipation of said component;
determining a thermal resistance from said component to a coolant;
determining a measured temperature of said component according to said heat dissipation and said thermal resistance at a plurality of time stamps included in thermal data output by said component; and
determining a relationship between said measured temperature and said thermal data for said component, wherein said relationship provides a calibration of said thermal data for said component to an actual temperature of said component having a workload.

2. The calibration method of claim 1, further comprising:
determining a thermal resistance between a thermocouple disposed at said component and a coolant temperature; and
determining said heat dissipation of said component based on a measured temperature at the thermocouple, said thermal resistance, said coolant temperature and a heat transfer function at a plurality of times.

3. The calibration method of claim 1, wherein
said thermal data comprises a difference between said measured temperature and a maximum allowable value of a junction temperature; and
said measured temperature associated with said component comprises said junction temperature.

4. The calibration method of claim 1, wherein
said thermal data comprises one of a temperature dependent electrical resistance value and a scaled electrical resistance value; and said measured temperature associated with said component comprises a junction temperature.

5. The calibration method of claim 1, wherein
said thermal data comprises one of a temperature dependent voltage value and a scaled voltage value; and
said measured temperature associated with said component comprises a junction temperature.

* * * * *